US007516476B1

(12) United States Patent
Kraemer et al.

(10) Patent No.: US 7,516,476 B1
(45) Date of Patent: Apr. 7, 2009

(54) METHODS AND APPARATUS FOR AUTOMATED CREATION OF SECURITY POLICY (75) Inventors: Jeffrey A. Kraemer, Wellesley, MA (US); Brian F. Costello, Cambridge, MA (US); Dan L. Grecu, Belmont, MA (US); Venkat R. Rangamani, Waltham, MA (US); Philip J. S. Gladstone, Framingham, MA (US); Alan J. Kirby, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 1101 days.

(21) Appl. No.: 10/395,711

(22) Filed: Mar. 24, 2003

(51) Int. Cl.
G06F 21/00 (2006.01)
G06F 11/30 (2006.01)
(52) U.S. Cl. ............................................ 726/1; 726/22
(58) Field of Classification Search ........................ None
See application file for complete search history.

(56) References Cited

U.S. PATENT DOCUMENTS

| | | | | |
|---|---|---|---|---|
| 5,991,877 A * | 11/1999 | Luckenbaugh | ................. | 726/1 |
| 6,088,804 A * | 7/2000 | Hill et al. | ....................... | 726/25 |
| 6,301,668 B1 * | 10/2001 | Gleichauf et al. | ............. | 726/25 |
| 7,281,270 B2 * | 10/2007 | Piesco et al. | ................... | 726/25 |
| 7,315,801 B1 * | 1/2008 | Dowd et al. | ................... | 703/13 |
| 7,363,656 B2 * | 4/2008 | Weber et al. | ................... | 726/23 |
| 7,376,969 B1 * | 5/2008 | Njemanze et al. | ............. | 726/22 |
| 2002/0178246 A1 * | 11/2002 | Mayer | ........................ | 709/223 |
| 2003/0046583 A1 * | 3/2003 | Goldman et al. | ............ | 713/201 |
| 2003/0093773 A1 * | 5/2003 | Reed et al. | ................... | 717/135 |
| 2003/0159060 A1 * | 8/2003 | Gales et al. | ................. | 713/200 |
| 2003/0226038 A1 * | 12/2003 | Raanan et al. | ............. | 713/201 |
| 2006/0242701 A1 * | 10/2006 | Black et al. | ................... | 726/22 |

* cited by examiner

*Primary Examiner*—Christopher A Revak (57) ABSTRACT

An automated method and apparatus for creating a security policy for one or more applications is provided. The method includes exercising the features of the one or more applications to generate behavioral data, applying a heuristic to aggregate the behavioral data into a subset of representative actions, and organizing the representative actions according to a structure defined by a template into a security policy for the one or more applications. The security policy may be downloaded to one or more workstations for deployment, and provides a safeguard to protect a computer system against cyber-terrorism.

85 Claims, 3 Drawing Sheets

METHODS AND APPARATUS FOR AUTOMATED CREATION OF SECURITY POLICY

FIELD OF THE INVENTION

This invention relates to computer network security, and more particularly to methods and apparatus for the automated creation of a security policy for a computer system.

BACKGROUND

Conventional network security systems can be said to provide either "active" or "passive" protection. Active security systems are designed to provide real-time barriers to intrusion via software- or hardware-based preprogrammed access prevention measures. Passive security systems provide the ability to detect and recover from observed breaches by collecting data on access activity for analysis, so that access control policies can be continually adjusted over time.

One example of an active security system is a reference monitor. Reference monitors execute on individual workstations or servers, and serve to regulate access to system resources thereon, such as file systems, system registries, and other resources. Reference monitors may provide stateful monitoring (such as with the reference monitor described in commonly assigned U.S. patent application Ser. No. 10/071, 328, entitled "Stateful Reference Monitor," which is incorporated herein by reference), whereby variations from a dynamic machine state are monitored, or stateless monitoring, whereby preprogrammed access settings are enforced.

One implementation of a system employing a reference monitor is disclosed in commonly assigned U.S. patent application Ser. No. 10/172,305, entitled "Stateful Distributed Event Processing And Adaptive Security," which is incorporated herein by reference and is directed to methods and apparatus for processing, at a central server, the access requests that are received by reference monitors across a networked computer system. The system provides the ability to correlate disparate events (i.e. access requests) and more effectively detect security breaches by determining whether seemingly isolated resource requests collectively constitute a security threat. When the system determines the presence of a threat, the server rapidly distributes revised security policy to reference monitors implemented on workstations that the system deems threatened by the activity. Such a system enables more effective regulation of resource access.

SUMMARY

Conventional network security systems suffer from a variety of deficiencies. One factor which can limit the effectiveness of a conventional security policy is that it often relies on a "one size fits all" approach to regulating access to system resources, irrespective of the applications and various versions thereof that execute on the system. As a result, a security policy may not be sufficiently flexible to protect against all application-based attacks, particularly on systems executing newly installed or upgraded applications. For example, a new version of conventional web server software may, when subject to a buffer overflow attack, attempt to execute a command shell which has privileges to access a specific system resource. The system administrator that installed the new version may not have been aware of the new vulnerability, and may not have adjusted the security policy in place. An attack could exploit the vulnerability and cause irreparable harm to the resource and/or system. Even if an administrator was aware of the danger and had modified the policy to restrict access to the considered resource, the modification may have affected the operation of other applications seeking to access the resource. Formulating a security policy that prevents actions that should be prevented, and allows actions that should be allowed, is a challenging exercise that must be repeated each time an application is installed or upgraded.

Moreover, the creation and modification of security policy can be an extremely time-consuming and laborious endeavor using conventional systems. Crafting an effective policy can require painstaking analysis of previous system activity. Once a policy is developed, it must be extensively tested before it can be deployed. This lengthy process can limit the effectiveness with which a system responds to security developments such as new viruses, and expose the system to unnecessary risk during the development and testing period.

Embodiments of the invention significantly overcome deficiencies associated with Conventional network security systems. A first embodiment of the invention is directed to a computer-implemented method of creating a security policy for at least one application executing on a computer system. The method comprises: (A) providing a template defining a security policy for the at least one application; (B) exercising the at least one application to generate a sample of actions representing actual behavior of the at least one application; (C) applying at least one heuristic to determine representative actions from the sample of actions performed by the at least one application; and (D) arranging the representative actions according to the template in order to produce a security policy. The method may further comprise downloading the security policy to at least one agent executing on the computer system, and employing the security policy to determine whether a request issued by the at least one application to access a system resource should be allowed or denied.

A second embodiment of the invention is directed to a computer-readable medium having instructions recorded thereon which, when executed by a computer, cause the computer to perform a method of creating a security policy for at least one application executing on a computer system. The method comprises: (A) providing a template defining a security policy for the at least one application; (B) exercising the at least one application to generate a sample of actions representing actual behavior of the at least one application; (C) applying at least one heuristic to determine representative actions from the sample of actions performed by the at least one application; and (D) arranging the representative actions according to the template in order to produce a security policy. The computer-readable medium may further comprise instructions defining downloading the security policy to at least one agent executing on the computer system, and employing the security policy to determine whether a request issued by the at least one application to access a system resource should be allowed or denied.

A third embodiment of the invention is directed to at least one signal, embodied in a computer-readable medium, which is operable to define a security policy for at least one application executing on a computing system. The at least one signal comprises a first segment providing a template defining a security policy for the at least one application; a second segment including instructions to exercise the at least one application to generate a sample of actions representing actual behavior of the at least one application; a third segment including instructions to apply at least one heuristic to determine representative actions from the sample of actions performed by the at least one application; and a fourth segment including instructions to arrange the representative actions according to the template in order to produce a security policy. The signal may further comprise a fifth segment including instructions to download the security policy to at least one agent executing on the computer system, and employ the security policy to determine whether a request issued by the at least one application to access a system resource should be allowed or denied.

A fourth embodiment of the invention is directed to a system for creating a security policy for at least one application executing on a computer system. The system comprises a first component to provide a template defining a security policy for the at least one application; a second component to exercise the at least one application to generate a sample of actions representing actual behavior of the at least one application; a third component to apply at least one heuristic to determine representative actions from the sample of actions performed by the at least one application; and a fourth component to arrange the representative actions according to the template in order to produce a security policy. The system may further comprise a component to download the security policy to at least one agent executing on the computer system, and employ the security policy to determine whether a request issued by the at least one application to access a system resource should be allowed or denied.

A fifth embodiment of the invention is directed to a system for deploying a security policy for at least one application. The system comprises a first component to exercise the at least one application to generate a sample of actions representing actual behavior of the at least one application; a second component to apply at least one heuristic to determine representative actions from the sample of actions performed by the at least one application; and a third component to arrange the representative actions according to a template to produce a security policy. The system may further comprise a fifth component to download the security policy to at least one agent executing on the computer system, and employ the security policy to determine whether a request issued by the at least one application to access a system resource should be allowed or denied.

A sixth embodiment of the invention is directed to a computer-implemented method of securing a computer system against terrorist attack. The method comprises: (A) providing a template defining a security policy for at least one application executing on a computer system; (B) exercising the at least one application to generate a sample of actions representing actual behavior of the at least one application; (C) applying at least one heuristic to determine representative actions from the sample of actions performed by the at least one application; (D) arranging the representative actions according to the template in order to produce a security policy; (E) downloading the security policy to at least one agent executing on the computer system; and (F) employing the security policy to determine whether a request issued by the at least one application to access a system resource should be allowed or denied.

BRIEF DESCRIPTION OF THE DRAWINGS

In the drawings, in which like reference designations indicate like elements.

DETAILED DESCRIPTION

Aspects of embodiments of the invention are directed to improving computer system security via the automated creation of a security policy. In one embodiment, a security policy is created specifically to regulate the actions of one or more applications executing on a system, based on the observed behavior of the application(s). Data is captured as the features of the application are exercised. This data is used to define a security policy according to a template which provides an arrangement for controls exerted by the policy over the application(s).

A first embodiment of the invention is directed to a method of automatically creating a security policy for one or more applications. In accordance with this embodiment, the features of the application(s) are exercised. As the applications execute, the access requests they issue are monitored and recorded. This data is aggregated into a set of "representative" actions for the application(s) according to a heuristic which, according to one embodiment, is configurable by automated or manual means. The representative actions provide input to a process which develops security policy for the application(s) according to a template. The template may define the structure of the security policy based, at least in part, on the previous behavior of the one or more applications on similar systems.

A second embodiment of the present invention is directed to a method of securing a computer system against cyber-terrorism. As with the above, the features of one or more applications are exercised, creating behavioral data which drives the creation of a security policy according to a template. The security policy is then downloaded to one or more workstations on the system, where it may be implemented by intelligent agents and/or reference monitors executing thereon. The agents and/or reference monitors then regulate access by the application(s) to system resources according to the policy, thereby better protecting the system against cyber-terrorism.

A third embodiment of the invention is directed to a user interface that facilitates more effective automated creation of a security policy. The user interface may allow a user to modify any of the tools or data used to create and implement a security policy, such as a template, behavioral data, heuristic, and/or a security policy itself. For example, a user interface might be used to fabricate and insert a particular application resource request into the data used to create a security policy for the application to ensure that the security policy accounts for the particular action.

A fourth embodiment is directed to a method for remotely creating or updating a security policy through a network-based exchange of security-related information. In accordance with this embodiment, a provider may remotely update a customer's security policy with respect to one or more applications by accessing the customer's system via a computer network, capturing a sample of actions exhibited by the application(s), aggregating those actions into a set of representative actions, and using the representative actions to create a security policy according to a template. Processing may be performed on the customer's system, the provider's system, another system altogether, or a combination thereof. The resulting security policy may then be transmitted or downloaded to the customer's system for deployment. In this manner, policy may be created or updated at predefined periods, upon the occurrence of a given event, or as otherwise desired.

Where processing is performed on a customer's system, a provider may also remotely update the heuristics, data, or template used to create a security policy. For example, a provider may, based on new information related to security threats attributed to a specific application, modify a template used by a customer to generate security policy for that application and regenerate the security policy to better protect the customer's system.

Figure 1:
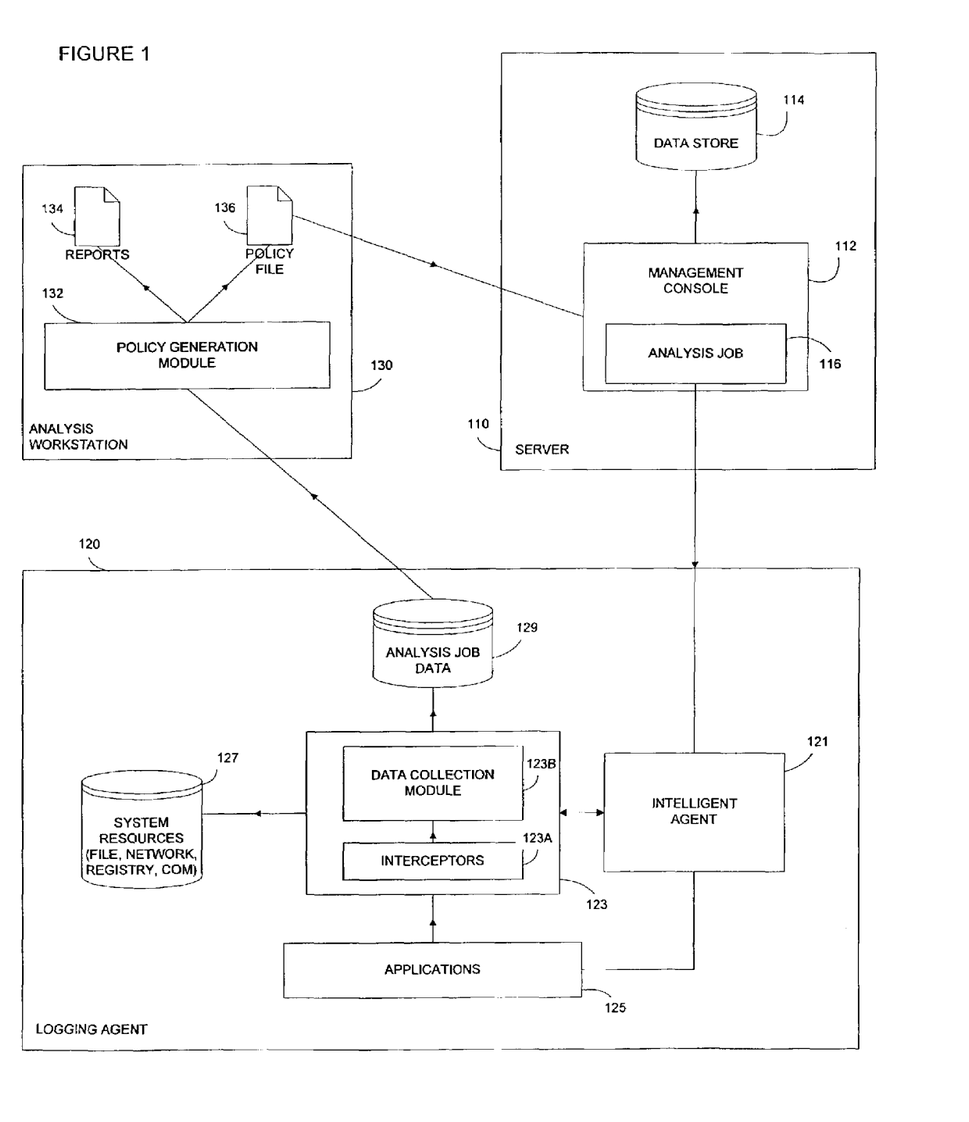
FIG. 1 is a block diagram of an exemplary embodiment of aspects of the invention.

FIG. 1 is a block diagram depicting exemplary system components used in the automated creation of a security policy. Shown in FIG. 1 is server 110, which initiates the process of gathering behavioral data from the application(s) for which the security policy is to be developed, logging agent 120, which monitors requests issued by the application(s) as features are exercised, and analysis workstation 130, which analyzes the data collected and produces the security policy. Server 110 includes, in the embodiment shown, management console 112 and data store 114. Management console 112, which may be the StormWatch management console offered by Okena, Inc., creates analysis job 116. In one embodiment, analysis job 116 comprises actions to be performed by the application(s) for which data is to be gathered (e.g., application features to be exercised), and specifies how long the application(s) should be monitored. The monitoring period may be expressed in any of numerous ways, as the invention is not limited to a particular implementation. For example, the monitoring period may be expressed as a time duration, as a maximum size for the resulting data file, as a maximum number of application invocations, other expression, or a combination thereof. In this respect, the monitoring period may span multiple re-boots of logging agent 120.

After analysis job 116 is created, it is transmitted to intelligent agent 121 for execution. Intelligent agent 121 is in communication with applications 125 and analysis module 123. Applications 125 may execute on one or more workstations on the system and need not comprise only the application(s) for which the security policy is being developed. Specifically, intelligent agent 121 may communicate with one or more applications, including the application(s) for which the policy is developed and others, to suspend or otherwise alter their operation during the execution of analysis job 116. In one example, intelligent agent 121 may suspend the operation of other applications so as to control system state during the execution of analysis job 116. In another example, intelligent agent 121 may communicate with analysis module 123 to alter the access privileges given to other applications during the execution of analysis job 116.

Analysis module 123 comprises interceptor 123A and data collection module 123B. In one embodiment, interceptor 123A comprises a reference monitor, such as the stateful reference monitor described above. However, interceptor 123A may comprise any of numerous suitably equipped monitoring tools. Similarly, data collection module 123B, which is used to gather data on application requests and the actions of interceptor 123A in response, may comprise any of numerous data gathering tools, such as a system logging tool.

In one embodiment, analysis job 116 is executed by intelligent agent 121 by invoking applications 125 to demonstrate various features as defined within the analysis job, thereby causing requests to be issued to access system resources. Analysis job 116, in one embodiment, is designed to invoke and exercise all features of the considered application(s), although the invention is not limited in this regard. For example, analysis job 116 may be designed to execute a subset of application operations, such as those wherein network resources are requested. Analysis job 116 may also be designed not to actually invoke the features of applications 125, but rather to simply gather information on the features of the considered application(s), while a user controls a thorough exercise of their features.

During the execution of analysis job 116, applications 125 submit requests to system resources 128 (such as a particular file, a network, the system's registry, or a COM object). These requests are received by interceptors 123A. Application requests and interceptor responses are recorded by data collection module 123B.

In one embodiment, the application is allowed to execute in an unrestricted manner, wherein interceptor 123A permits all resource requests attempted by application(s) 125. However, the invention is not limited in this respect, as other embodiments may comprise application(s) 125 executing in a restricted mode wherein interceptor 123A denies all requests issued by application(s) 125 to access system resources. Still other embodiments may have the application executing in a combination of modes in order to capture the most useful sample of data, based on the needs of the system and the policy.

In one embodiment, applications 125 execute in a controlled environment (such as a test lab), where actions attempted by applications 125 do not affect the operation of other applications executing on the system and are not permitted access to a network. However, the invention is not limited in this respect, as analysis job 116 may be executed in a "live" environment. Furthermore, if other applications are permitted to operate during analysis job 116, and normal access rules for system applications 125 may be in effect during this process. Alternatively, normal rules may be in effect for all applications except those being tested.

In one embodiment, analysis job 116 is constructed to execute only those actions of applications 125 that are deemed "correct" (i.e., those which will not cause the system harm). In some instances it may be desirable to execute only correct actions, as incorrect actions, such as the proliferation of a virus, may adversely affect subsequent operations and skew a resulting security policy with respect to those operations. However, the invention is not limited in this regard, as it may be desirable to have the sample contain examples of both correct and incorrect behavior so that the resulting security policy appropriately accounts for both. Analysis job 116 may include a combination of correct and incorrect actions, or may include only incorrect actions.

During the execution of analysis job 116, it may be advantageous to employ an interceptor 123A which is very similar to, if not the same, interceptor component which will implement the resulting security policy. For instance, in cases where the interceptor is a reference monitor, it should be appreciated that reference monitors are often configured to respond very differently to, and record different information regarding, certain types of application requests. Thus, a security policy which directs one interceptor to respond to an operation or record information in a particular manner may not be optimally implemented with another interceptor.

Requests issued by applications 125 and respective responses by interceptor 123A are captured by data collection module 123b, which compiles this information into analysis job data 129. Analysis job data 129 may be compiled in any suitable manner, as the invention is not limited to a particular implementation. In one embodiment, the data is written to a single flat file.

Analysis job data 129 is then transferred to analysis workstation 130, where it is received by policy generation module 132, the operation of which is discussed in detail with reference to FIG. 2 below. The transfer of analysis job data 129 may be accomplished in any of numerous ways. In one example, the data is transmitted to analysis workstation 130 using TCP/IP.

Policy generation module 132 analyzes the data to determine how the application(s) issue requests to access resources, the types of requests made, requests typical to certain system resources, and other observations. Policy generation module 132 may perform any of numerous analyses, as the invention is not limited in this regard.

Analysis job data 129 may comprise numerous requests to access system resources. In one embodiment, analysis job data 129 may be modified before it is used to create a security policy. As discussed above, a user interface may be employed to perform this modification. Alternatively, automated routines or other tools may be employed to perform this modification. Data modification may be advantageous for several reasons. For example, a user may ensure proper "coverage" by inserting a certain type of request (or sequence of requests) that was not exhibited by the application in the course of executing analysis job 116. In one embodiment, data modification may take place after data collection is completed. However, the invention is not limited in this respect, as modification may also take place before data collection begins, or while data collection is in progress.

Resource requests may be specific to the system on which analysis job 116 as executed. For example, an application version designed to execute under a certain operating system may be configured to, when creating a file, modify a configuration file maintained by the operating system. To ensure that the policy accommodates as many application features as necessary, it may be advantageous for logging agent 120 to replicate, as closely as possible, the system on which the security policy will be implemented. Nevertheless, the invention is not limited to creating a security policy for the computer system where application features are exercised, and a security policy may be created or updated on one environment and implemented on another.

Policy generation module 132 employs analysis job data 129 to produce policy file 136 and reports 134. As will be discussed in detail below, policy file 136 comprises one or more data structures which, when implemented, enforce a security policy for the application(s). Policy file 136 may take any of numerous forms, as the invention is not limited to a particular implementation. In one, policy file 136 comprises an XML file. In the embodiment depicted in FIG. 1, the policy file is transferred to management console 112 for implementation. Management console 112 may execute one or more automated routines to incorporate the security policy into an existing body of policies. In the embodiment depicted, the security policy is transferred to data store 114 for storage. It should be appreciated that the security policy need not be implemented by a management console, and that it need not reside in a data store when implemented.

Policy generation module 132 also produces reports 134 from analysis job data 129. The reports may provide a useful tool to audit the behavior of the application(s) for which the security policy is being developed, and may also provide a useful tool for identifying areas in which the security policy may be fine-tuned. For example, reports 134 may reveal that the application(s) attempted to overwrite particular document files, and that as a result, the security policy prevents the application(s) from overwriting any document file. Reviewing the reports might compel a user, for example, to adjust the security policy to prevent only certain document files from being overwritten. Reports 134 may take any of numerous forms, such as paper-based, electronic or other form.

Figure 2:
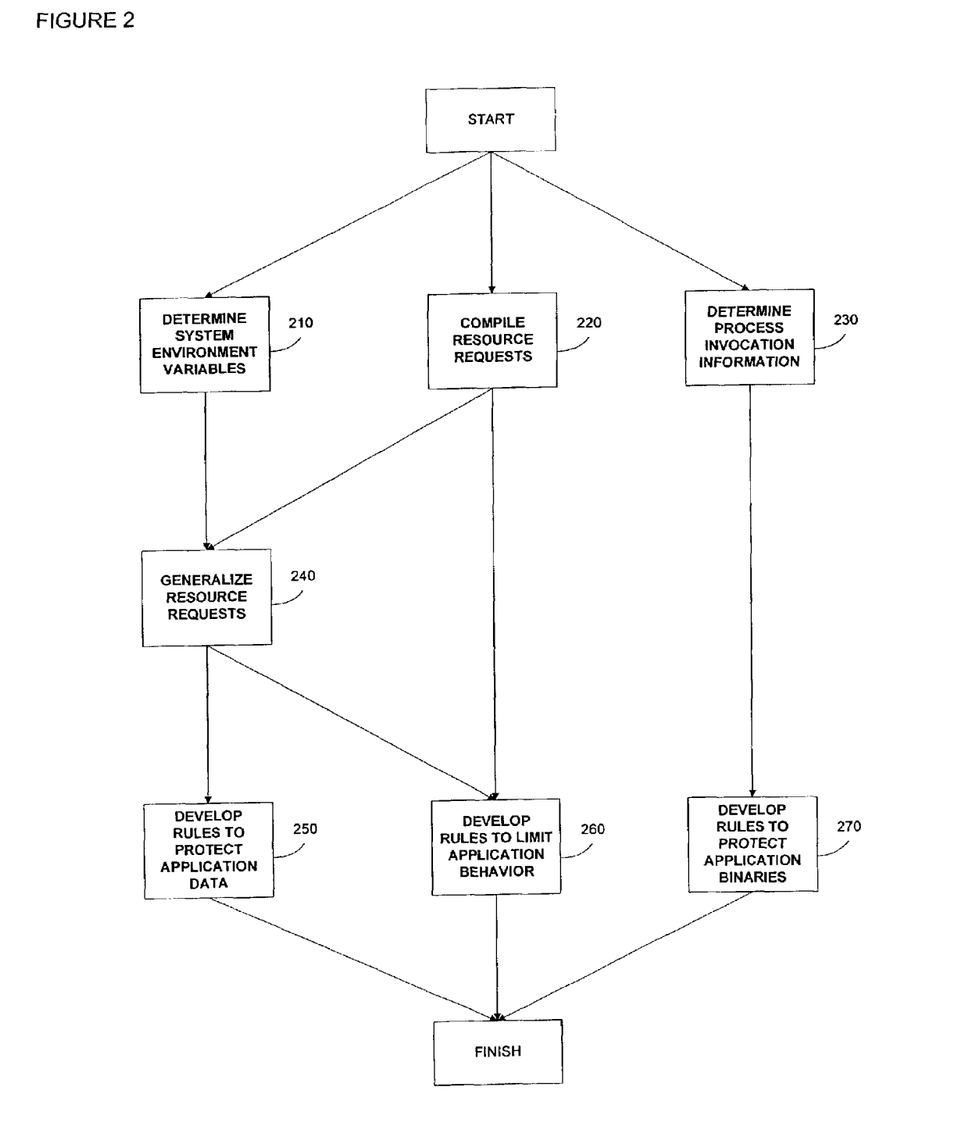
FIG. 2 is a flow chart depicting an exemplary method embodying aspects of the invention.

FIG. 2 depicts an exemplary process for creating a security policy using data collected during the execution of analysis job 116 (i.e., analysis job data 129). In the embodiment depicted, upon the start of the process, acts 210, 220 and 230 begin simultaneously.

In act 210, the process determines the system environment variables in place when analysis job data 129 was collected. The process may, for instance, identify the location of the Windows directory, the definitions of certain COM objects, and/or system state. Because the system environment may have changed during the collection of analysis job data 129, in one embodiment, act 210 comprises an act of discerning the system environment in place during the entire execution of analysis job 116. This may be accomplished in any of numerous ways. In one example, analysis job data 129 simply reflects the system environment at the time each action in analysis job 116 was executed. In another example, analysis job data 129 provides a time stamp for each action, and a separate time-stamped collection of system environment data in another data structure. Other methods of recreating the system environment, including system state, may alternatively be employed, as the invention is not limited to a particular implementation.

In act 220, the process establishes the specific resource requests which comprise analysis job data 129. This may be accomplished in any of numerous says, as the invention is not limited to a particular technique. In one example, analysis job data 129 is simply read to determine the resource requests contained therein.

In act 230, process invocation information is recorded. In one embodiment, this includes recording the time at which the applications were started, and the duration for which they executed. For instance, process invocation information may indicate that the Microsoft Word application was started at 1:30 p.m. and was executed for approximately 29 minutes. Process invocation information may include any of numerous expressions of process execution, as the invention is not limited in this regard. Process invocation information may prove valuable when attempting to troubleshoot the security policy development process.

Upon the completion of act 230, the process proceeds to act 270, wherein rules are developed to protect application binaries (e.g., files containing machine-readable executable code or data used by applications). In one embodiment, the process detects binaries used by an application(s), and simply prevents other processes from accessing those binaries. For instance, if the application for whom the policy is being created is Microsoft SQL Server, the process may detect where SQL Server binaries are located, and formulate a rule preventing other applications from accessing those files. In other instances, more sophisticated binary access rules may be developed.

Upon the completion of acts 210 and 220, the process proceeds to act 240, wherein resource generalization occurs. Resource generalization is performed to identify the general actions that a security policy should regulate, based on the specific resource requests issued by the application(s). Requests to access resources may be generalized at various levels. For instance, if an application attempts to overwrite a document named "ABC.doc", depending on the level of resource generalization, a resulting security policy may dictate that the application should be prevented from writing to all documents with the extension ".doc," from writing to all documents whose names include "ABC.doc," from overwriting documents, from writing data files altogether, or impose other controls.

Resource generalization is performed by applying a heuristic to the resource request data produced in act 220. Resource generalization defines a set of representative actions used to guide the development of security policy for the application(s). Specifically, the heuristic defines the commonality between actions required to aggregate those actions into a representative action. In one embodiment, the heuristic is configurable to suit the needs of various systems. Indeed, it should be appreciated that because an application may perform very differently when executed on two different computer systems (especially where those computer systems employ different resources for the same operation or utilize resources differently), it may be advantageous to configure the heuristic to produce different representative actions for different systems.

In one embodiment, a user may configure a heuristic by providing input defining the level of commonality needed to aggregate requests into representative actions. User input may be received via a user interface that prompts the user to define how tightly requests must match before they are aggregated into a representative action, that poses questions to the user as the desired strictness of comparison, that allows the user to specify certain actions which should survive in a comparison, or that otherwise accepts user input. A user may provide input before resource generalization occurs, in response to examining a set of "draft" representative actions created by the system, or at other times.

In another embodiment, an automated routine may configure a heuristic based on a preliminary examination of request data. In one example, the routine may examine the data with an eye toward one or more objectives specified by a user (e.g., a desired rigor of a resulting security policy) to determine the most effective comparison rules. In another example, the process may build comparison rules to eliminate access to certain resources (such as the system registry). The invention is not limited to configuring the heuristic in these or other ways, as numerous implementations are possible.

In yet another embodiment, the heuristic may be configured to compare records in such a way that a "reasonable" security policy is developed. For example, because a reasonable, or standard, security policy may dictate that application binaries should not be accessible to other applications, the heuristic may be configured to ensure that the representative action that comprises accessing those files is eliminated, and/or that a resulting security policy prevents the operation.

Upon the completion of act 240, the process proceeds to acts 250. In act 250, rules are developed to protection application data. In one embodiment, the process identifies files used by the application(s) for which the policy is being developed, and defines rules preventing other applications from accessing data used exclusively thereby. For instance, if a policy is being developed for the SQL Server application, the process detects files used by SQL Server to perform its functions, and develops rules preventing other applications from writing to those files.

Upon the completion of acts 220 and 240, the process proceeds to act 260. In act 260, rules are developed to regulate the behavior of the one or more applications for which the policy is being created. For example, rules may be developed to limit an application's behavior by preventing access to certain resources, or to grant access to specific resources for general operation. Rules may be developed and assembled in any of numerous ways, as the invention is not limited to a particular implementation.

Acts 250, 260 and 270 are accomplished using a template, which defines how representative actions form security policy rules. A template may take any of numerous forms. In one embodiment, the template may comprise a standard security policy for the application(s), and representative actions are either added to the standard policy or cause actions to be removed from the standard policy, or a combination of thereof. For example, a standard policy for an application may dictate that access to the network should not be permitted, but if after the execution of analysis job 116 it is determined that such an operation is required, does not pose undue risk, or is otherwise desirable, the standard policy may be amended to permit this operation.

The template need not embody a standard policy, however, and may comprise a data structure, methodology, process, or the like. In another embodiment, the template simply provides a methodology for how the security policy should be formed from representative actions. For example, a template may comprise one or more data structures defining how representative actions should be arranged to form a security policy so that implementation of the policy proceeds smoothly. For instance, a template which comprises one or more data structures may dictate the order or structure in which security policy rules are codified for execution by management console 112. Whatever the function of the template, it is used in acts 250, 260 and 270 to formulate the security policy embodied in policy file 136 (FIG. 1).

Upon the completion of acts 250, 260 and 270, the process terminates. In one embodiment, the policy file 136 is transferred to server 110, and more specifically to management console 112, which may incorporate the security policy into an existing body of policies by, for example, storing the policy in data store 114.

Figure 3:
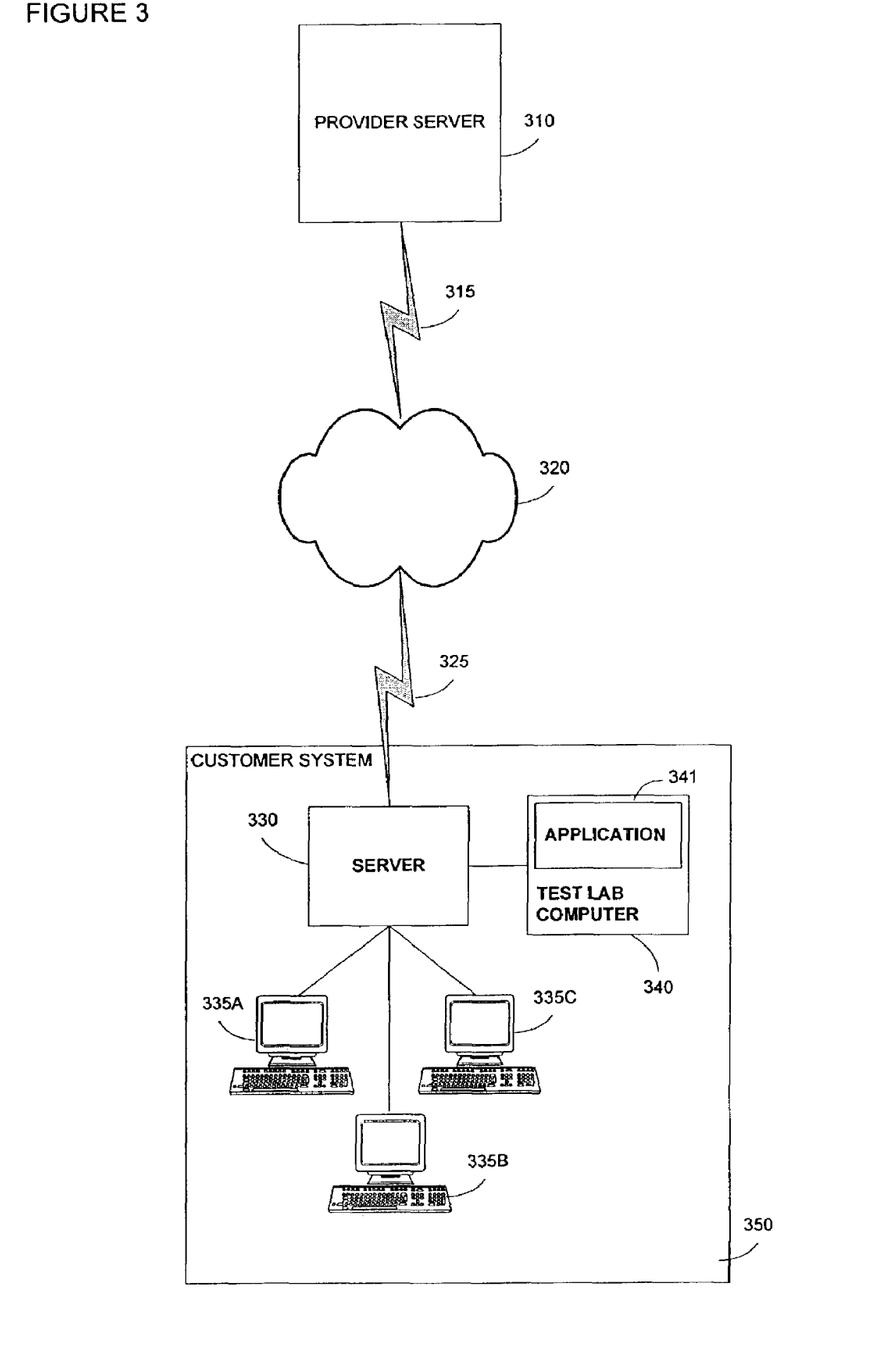
FIG. 3 is a block diagram of an exemplary implementation of aspects of the invention.

A system which may be used to remotely create or update a security policy is depicted in FIG. 3. Provider server 310, which may comprise one or more general-purpose computers equipped with components for transmitting and receiving data, communicates with customer system 350 via provider connection 315, network 320 (which may comprise a LAN, the Internet, another network, or a combination thereof), and customer connection 325. Customer system 350 includes server 330, which is also equipped to transmit and receive data. Customer server 330 is coupled to test lab computer 340, and to workstations 335A, 335B and 335C. Application 341 is installed on test lab computer 340, which operates in a controlled environment so that application testing does not interfere with other business functions occurring on server 330 or workstations 335A-C.

To begin the remote policy creation process, provider server 310 communicates with customer server 330 initiate analysis job 116 (FIG. 1). This may be performed in numerous ways, as the invention is not limited to a particular implementation. In one example, provider server 310 transmits instructions comprising analysis job 116 to customer server 330, and the instructions are processed by customer server 330. In another example, provider server 310 communicates with a management console executing on customer server 330 and requests that it initiate analysis job 116.

In one embodiment, analysis job data 129 is then uploaded to customer server 330 for processing, in a manner as described above with reference to FIG. 2. Specifically, analysis job data 129 is analyzed to determine representative actions by applying a heuristic, and then representative actions are used to develop a security policy. In another embodiment, analysis job data 129 is transmitted to provider server 310 over network 320, where processing then occurs. In yet another embodiment, processing may be split between the servers, or between these and other server(s). The invention is not limited in this regard, as numerous implementations are possible.

In the embodiment wherein processing is performed on customer server 330, provider server 310 may transmit instructions defining analysis job 116, a heuristic to define representative actions, and a security policy template to customer server 330 over network 320. Any or all of these may be provided in the form of source code, executable code, or other data structure comprising instructions defining the security policy development process described above.

Upon the completion of security policy development, the policy may be transferred to individual workstations 335A-C. This may be accomplished in numerous ways. For example, the server 330 may transmit the policy to individual workstations, the workstations could be alerted that a new policy is available whereupon they would initiate a download of the new policy, or other techniques could be employed. The updated policy is employed to regulate the application's requests to access system resources.

After the security policy is applied, if it causes an application to fail, it may be immediately modified. This may be accomplished in any of numerous ways. In one example, a management console executing on customer system 350 may modify the security policy. By determining the policy component that caused the application to fail, and then removing that component. For example, if not being able to access an application vendor's web site causes the application to "hang," the security policy component prohibiting this action can be modified or removed to grant permission to perform this action. This permission may be granted on a temporary or conditional basis, and may be retracted as circumstances dictate.

The system may also be configured to alert a user when an application performs an action which is not prohibited per se by a security policy, but which the system deems abnormal. In one embodiment, abnormality may be defined via predefined parameters supplied by a user, although numerous techniques for accomplishing this are possible. Once the user has been alerted, the user may request that the security policy adapt to prevent the considered action from subsequently occurring. The user may also, or alternatively, place the system in "test mode" so that a questionable action may be observed for a time. After an observation period, the user may decide to modify the security policy or leave it as is.

In one embodiment, the system's response to a denied request may be configured. As discussed above, when the policy causes an action to be denied, the system may prompt the user to modify the security policy, the system may automatically modify the security policy itself, or it may prompt the user to perform another action.

It should be appreciated that the process of developing security policy comprising of monitoring the features of one or more applications, aggregating the resource requests thus produced into a subset of representative actions, and developing a policy using the representative actions according to a template and optionally downloading the security policy to one or more workstations for enforcement may be performed in a semi-automated fashion (e.g., wherein a human operator intervenes to initiate analysis job 116) or completely automated fashion, wherein no human intervention is required. It should also be appreciated that this process may be executed in real time, such that the process may be configured to observe the behavior of an application, employ resulting data to create or modify a security policy, and download the policy to reference monitors on the system. Furthermore, as discussed above, these updates may be initiated and coordinated from remote locations.

The above described embodiments of the present invention can be implemented in any of numerous ways. For example, the above discussed functionality can be implemented using hardware, software or a combination thereof. When implemented in software, the software code can be executed on any suitable processor or collection of processors whether provided in a single computer or distributed among multiple computers. In this respect, it should be appreciated that the functions discussed above can be distributed among multiple processors and/or systems. It should further be appreciated that any component or collection of components that perform the functions described herein can be generically considered as one or more controllers that control the functions discussed above. The one or more controllers can be implemented in numerous ways, such as with dedicated hardware, or by employing one or more processors that are programmed using microcode or software to perform the functions recited above where a controller stores or provides data for system operation, such data may be stored in a central repository, in a plurality of repositories or a combination thereof.

It should be appreciated that one implementation of the embodiments of the present invention comprises at least one computer readable medium (e.g., a computer memory, a floppy disk, compact disk, a tape etc.) encoded with a computer program (i.e., a plurality of instructions) which when executed on a processor performed the above-discussed functions of the embodiments of the present invention. The computer readable medium can be transportable such that the programs stored thereon can be loaded onto any computer system resource to implement the aspects of the present invention discussed herein. In addition, it should be appreciated that the reference to a computer program which when executed performs the above-discussed functions is not limited to an application program running on a host computer. Rather, the term "computer program" is used herein in the generic sense to reference any type of computer code (e.g., software or microcode) that can be employed to program a processor to implement the above discussed aspects of the present invention.

Having described several embodiments of the present invention in detail, various modifications and improvements may occur readily to the those skilled in the art. Such modifications and improvements are intended to be within the spirit and scope of the invention. Accordingly, the foregoing description is by way of example only and is not intended as limiting. The invention is limited only as defined by the following claims and the equivalents thereto.

What is claimed is:

1. A computer-implemented method of creating a security policy for at least one application executing on a computer system, the method comprising:
   (A) providing a template defining a security policy for the at least one application;
   (B) exercising the at least one application to generate a sample of actions representing actual behavior of the at least one application;
   (C) applying at least one heuristic to determine representative actions from the sample of actions performed by the at least one application; and
   (D) arranging the representative actions according to the template in order to produce a security policy.

2. The method of claim 1, wherein (C) comprises aggregating the sample of actions to a subset of actions, the subset defining the representative actions.

3. The method of claim 1, wherein (B) comprises exercising the at least one application in a controlled environment.

4. The method of claim 1, wherein (B) comprises generating a sample of actions which represents correct behavior for the at least one application.

5. The method of claim 1, wherein (C) comprises determining the representative actions based, at least in part, on the system resource accessed by the at least one application in each action.

6. The method of claim 1, wherein (A) comprises providing a template which varies according to the computer system on which the at least one application executes.

7. The method of claim 1, wherein (C) comprises applying a heuristic which varies according to the computer system on which the at least one application executes.

8. The method of claim 1, wherein (C) comprises applying a heuristic which is defined in response to examining at least one of the sample of actions and the representative actions.

9. The method of claim 8, wherein a user examines the sample of actions and the representative actions to define the heuristic.

10. The method of claim 9, wherein the user defines the heuristic by defining a strictness of a comparison of actions used to aggregate actions into the subset.

11. The method of claim 9, wherein the user defines the heuristic by responding to at least one question related to the comparison of actions.

12. The method of claim 1, wherein (C) further comprises applying a heuristic which is defined by an automated process.

13. The method of claim 1, further comprising:
    (E) downloading the security policy to at least one agent executing on the computer system.

14. The method of claim 13, wherein (E) comprises, after downloading the security policy, employing the security policy to determine whether a request issued by the at least one application to access a system resource should be allowed or denied.

15. The method of claim 1, further comprising:
    (F) producing a report illustrating the behavior of the at least one application.

16. A computer-readable medium having instructions recorded thereon which, when executed by a computer, cause the computer to perform a method of creating a security policy for at least one application executing on a computer system, the method comprising:
    (A) providing a template defining a security policy for the at least one application;
    (B) exercising the at least one application to generate a sample of actions representing actual behavior of the at least one application;
    (C) applying at least one heuristic to determine representative actions from the sample of actions performed by the at least one application; and
    (D) arranging the representative actions according to the template in order to produce a security policy.

17. The computer-readable medium of claim 16, wherein (C) comprises aggregating the sample of actions to a subset of actions, the subset defining the representative actions.

18. The computer-readable medium of claim 16, wherein (B) comprises exercising the at least one application in a controlled environment.

19. The computer-readable medium of claim 16, wherein (B) comprises generating a sample of actions which represents correct behavior for the at least one application.

20. The computer-readable medium of claim 16, wherein (C) comprises determining the representative actions based, at least in part, on the system resource accessed by the at least one application in each action.

21. The computer-readable medium of claim 16, wherein (A) comprises providing a template which varies according to the computer system on which the at least one application executes.

22. The computer-readable medium of claim 16, wherein (C) comprises applying a heuristic which varies according to the computer system on which the at least one application executes.

23. The computer-readable medium of claim 16, wherein (C) comprises applying a heuristic which is defined in response to examining at least one of the sample of actions and the representative actions.

24. The computer-readable medium of claim 23, further comprising instructions defining accepting user input in response to the user's examination of the sample of actions and the representative actions, wherein the user input is used to define the heuristic.

25. The computer-readable medium of claim 24, wherein the user defines the heuristic by defining a strictness of a comparison of actions used to determine the representative actions.

26. The computer-readable medium of claim 24, wherein the user defines the heuristic by responding to at least one question related to a comparison of actions.

27. The computer-readable medium of claim 16, wherein (C) further comprises applying a heuristic which is defined by an automated process.

28. The computer-readable medium of claim 16, further comprising instructions defining:
    (E) downloading the security policy to at least one agent executing on the computer system.

29. The computer-readable medium of claim 28, wherein (E) comprises, after downloading the security policy, employing the security policy to determine whether a request issued by the at least one application to access a system resource should be allowed or denied.

30. The computer-readable medium of claim 16, further comprising instructions defining:
    (F) producing a report illustrating the behavior of the at least one application.

31. A system for creating a security policy for at least one application executing on a computer system, the system comprising:
    a first component to provide a template defining a security policy for the at least one application;
    a second component to exercise the at least one application to generate a sample of actions representing actual behavior of the at least one application;
    a third component to apply at least one heuristic to determine representative actions from the sample of actions performed by the at least one application; and
    a fourth component to arrange the representative actions according to the template in order to produce a security policy,
    where at least one of, the first component, the second component, the third component, and the fourth component are embodied on a computer-readable medium.

32. The system of claim 31, wherein the third component aggregates the sample of actions to a subset of actions, the subset defining the representative actions.

33. The system of claim 31, wherein the second component exercises the at least one application in a controlled environment.

34. The system of claim 31, wherein the second component generates a sample of actions which represents correct behavior for the at least one application.

35. The system of claim 31, wherein the third component determines the representative actions based, at least in part, on the system resource accessed by the at least one application in each action.

36. The system of claim 31, wherein the first component provides a template which varies according to the computer system on which the at least one application executes.

37. The system of claim 31, wherein the third component applies a heuristic which varies according to the computer system on which the at least one application executes.

38. The system of claim 31, wherein the third component applies a heuristic which is defined in response to examining at least one of the sample of actions and the subset of actions.

39. The system of claim 38, further comprising:
a fifth component to accept user input in response to the user's examination of the sample of actions and the representative actions, wherein the user input is used to define the heuristic.

40. The system of claim 39, wherein the user input defines a strictness of a comparison of actions used to aggregate actions into the representative actions.

41. The system of claim 39, wherein the user input defines a response to at least one question related to a comparison of actions.

42. The system of claim 31, wherein the third component applies a heuristic which is defined by an automated process.

43. The system of claim 31, further comprising:
a sixth component to download the security policy to at least one agent executing on the computer system.

44. The system of claim 43, wherein the sixth component, after downloading the security policy, employs the security policy to determine whether a request issued by the at least one application to access a system resource should be allowed or denied.

45. The system of claim 31, further comprising:
a seventh component to produce a report illustrating the behavior of the at least one application.

46. A system for deploying a security policy for at least one application, the system comprising:
a first component to exercise the at least one application to generate a sample of actions representing actual behavior of the at least one application;
a second component to apply at least one heuristic to determine representative actions from the sample of actions performed by the at least one application; and
a third component to arrange the representative actions according to a template to produce a security policy.

47. The system of claim 46, wherein the second component aggregates the sample of actions to a subset of actions, the subset defining the representative actions.

48. The system of claim 46, wherein the first component exercises the at least one application in a controlled environment.

49. The system of claim 46, wherein the first component generates a sample of actions which represents correct behavior for the at least one application.

50. The system of claim 46, wherein the second component determines the representative actions based, at least in part, on the system resource accessed by the at least one application in each action.

51. The system of claim 46, wherein the third component modifies a template which varies according to the computer system on which the at least one application executes.

52. The system of claim 46, wherein the second component applies a heuristic which varies according to the computer system on which the at least one application executes.

53. The system of claim 46, wherein the second component applies a heuristic which is defined in response to examining at least one of the sample of actions and the subset of actions.

54. The system of claim 53, further comprising:
a fourth component to accept user input in response to the user's examination of the sample of actions and the representative actions, wherein the user input is used to define the heuristic.

55. The system of claim 54, wherein the user input provides a strictness of a comparison of actions used to aggregate actions into the subset.

56. The system of claim 54, wherein the user input provides a response to at least one question related to a comparison of actions.

57. The system of claim 46, wherein the second component applies a heuristic which is defined by an automated process.

58. The system of claim 46, further comprising:
a fifth component to download the security policy to at least one agent executing on the computer system.

59. The system of claim 58, wherein the sixth component, after downloading the security policy, employs the security policy to determine whether a request issued by the at least one application to access a system resource should be allowed or denied.

60. The system of claim 46, further comprising:
a sixth component to produce a report illustrating the behavior of the at least one application.

61. A computer-implemented method of securing a computer system against terrorist attack, the method comprising:
(A) providing a template defining a security policy for at least one application executing on a computer system;
(B) exercising the at least one application to generate a sample of actions representing actual behavior of the at least one application;
(C) applying at least one heuristic to determine representative actions from the sample of actions performed by the at least one application;
(D) arranging the representative actions according to the template in order to produce a security policy;
(E) downloading the security policy to at least one agent executing on the computer system; and
(F) employing the security policy to determine whether a request issued by the at least one application to access a system resource should be allowed or denied.

62. The method of claim 61, wherein (C) comprises aggregating the sample of actions to a subset of actions, the subset defining the representative actions.

63. The method of claim 61, wherein (B) comprises exercising the at least one application in a controlled environment.

64. The method of claim 61, wherein (B) comprises generating a sample of actions which represents correct behavior for the at least one application.

65. The method of claim 61, wherein (C) comprises determining the representative actions based, at least in part, on the system resource accessed by the at least one application in each action.

66. The method of claim 61, wherein (A) comprises providing a template which varies according to the computer system on which the at least one application executes.

67. The method of claim 61, wherein (C) comprises applying a heuristic which varies according to the computer system on which the at least one application executes.

68. The method of claim 61, wherein (C) comprises applying a heuristic which is defined in response to examining at least one of the sample of actions and the subset of actions.

69. The method of claim 68, wherein a user defines a heuristic by examining the sample of actions and the subset of actions.

70. The method of claim 69, wherein the user defines the heuristic by defining a strictness of a comparison of actions used to aggregate actions into the subset.

71. The method of claim 69, wherein the user defines the heuristic by responding to at least one question related to the comparison of actions.

72. The method of claim 61, wherein (C) further comprises applying a heuristic which is defined by an automated process.

73. The method of claim 61, further comprising:
 (G) producing a report illustrating the behavior of the at least one application.

74. A computer-readable medium having instructions recorded thereon which, when executed by a computer, cause the computer to perform a method of creating a security policy for at least one application executing on a computer system, the method comprising:
 (A) providing a template defining a security policy for the at least one application;
 (B) exercising the at least one application to generate a sample of actions representing actual behavior of the at least one application;
 (C) applying at least one heuristic to determine representative actions from the sample of actions performed by the at least one application, wherein the heuristic is defined using input accepted from a user in response to the user's examination of the at least one of the sample of actions and the representative actions; and
 (D) arranging the representative actions according to the template in order to produce a security policy.

75. The computer-readable medium of claim 74, wherein the user defines the heuristic by defining a strictness of a comparison of actions used to determine the representative actions.

76. The computer-readable medium of claim 74, wherein the user defines the heuristic by responding to at least one question related to a comparison of actions.

77. The computer-readable medium of claim 74, wherein (C) comprises aggregating the sample of actions to a subset of actions, the subset defining the representative actions.

78. The computer-readable medium of claim 74, wherein (B) comprises exercising the at least one application in a controlled environment.

79. The computer-readable medium of claim 74, wherein (B) comprises generating a sample of actions which represents correct behavior for the at least one application.

80. The computer-readable medium of claim 74, wherein (C) comprises determining the representative action based, at least in part, on the system resource accessed by the at least one application in each action.

81. The computer-readable medium of claim 74, wherein (A) comprising providing a template which varies according to the computer system on which the at least one application executes.

82. The computer-readable medium of claim 74, wherein (C) comprises applying a heuristic which varies according to the computer system on which the at least one application executes.

83. The computer-readable medium of claim 74, further comprising instructions defining:
 (E) downloading the security policy to at least one agent executing on the computer system.

84. The compute-readable medium of claim 83, wherein (E) comprises, after downloading the security policy, employing the security policy to determine whether a request issued by the at least one application to access a system resource should be allowed or denied.

85. The computer-readable medium of claim 83, further comprising instructions defining:
 (F) producing a report illustrating the behavior of the at least one application.

\* \* \* \* \*